United States Patent
Schaube et al.

(10) Patent No.: US 12,429,125 B1
(45) Date of Patent: Sep. 30, 2025

(54) METHOD OF EXCHANGING A RACK OF A RACK AND PINION DRIVE ARRANGEMENT AND JIG ASSEMBLY

(71) Applicant: CASCADE DRIVES AB, Sollentuna (SE)

(72) Inventors: Kym Schaube, Stockholm (SE); Rasmus Nord, Bromma (SE); Erik Ejdepalm, Knivsta (SE); Pontus Karlsson, Sollentuna (SE)

(73) Assignee: CASCADE DRIVES AB, Sollentuna (SE)

( * ) Notice: Subject to any disclaimer, the term of this patent is extended or adjusted under 35 U.S.C. 154(b) by 0 days.

(21) Appl. No.: 18/862,229

(22) PCT Filed: May 3, 2023

(86) PCT No.: PCT/EP2023/061693
§ 371 (c)(1),
(2) Date: Nov. 1, 2024

(87) PCT Pub. No.: WO2023/217609
PCT Pub. Date: Nov. 16, 2023

(30) Foreign Application Priority Data

May 3, 2022 (EP) .................................... 22171282

(51) Int. Cl.
*F16H 57/00* (2012.01)
*B23P 19/10* (2006.01)
(Continued)

(52) U.S. Cl.
CPC ............. *F16H 57/00* (2013.01); *B23P 19/10* (2013.01); *F16H 19/04* (2013.01); *F16H 55/26* (2013.01);
(Continued)

(58) Field of Classification Search
CPC ..... F16H 2057/0068; F16H 2057/0062; F16H 55/26; F16H 19/04; F16H 57/00; B23P 19/10
(Continued)

(56) References Cited

U.S. PATENT DOCUMENTS

| | | |
|---|---|---|
| 2015/0274191 A1 | 10/2015 | Vogler |
| 2017/0082179 A1* | 3/2017 | Lundbäck ............. F16H 19/043 |
| 2018/0087326 A1 | 3/2018 | Wurster et al. |

FOREIGN PATENT DOCUMENTS

| | | |
|---|---|---|
| CN | 201382139 Y | 1/2010 |
| CN | 101545527 B | 6/2011 |

(Continued)

OTHER PUBLICATIONS

Extended European Search Report dated Sep. 28, 2022 for EP Application No. 22171282.1, 9 pages.
(Continued)

*Primary Examiner* — T. Scott Fix
(74) *Attorney, Agent, or Firm* — RMCK Law Group, PLC (57) ABSTRACT

A method of exchanging a rack of a rack and pinion drive arrangement, and associated jig assembly, are disclosed. The method includes providing a rack and pinion drive arrangement, with a first rack installed in meshing engagement with the pinions of the gearbox; providing a jig assembly comprising a second toothed rack and a coupling arrangement; arranging the second rack in longitudinal coaxial alignment with the first rack; connecting a first end of the second rack to a proximal end of the first rack, via the coupling arrangement; bringing the second rack into meshing engagement with the pinions of the gearbox by linear displacement of the first and second rack, disconnecting the first rack from the second rack. The nominal rotational position between the respective pinions and primary gears may be calibrated
(Continued)

either when the first or the second rack is in meshing engagement with the pinions of the gearbox.

16 Claims, 3 Drawing Sheets

(51) Int. Cl.
*F16H 19/04* (2006.01)
*F16H 55/26* (2006.01)

(52) U.S. Cl.
CPC ............... *F16H 2057/0062* (2013.01); *F16H 2057/0068* (2013.01)

(58) Field of Classification Search
USPC ........................................................ 74/89.17
See application file for complete search history.

(56) References Cited

FOREIGN PATENT DOCUMENTS

| | | |
|---|---|---|
| DE | 10103490 A1 | 8/2002 |
| DE | 102007018919 A1 | 10/2008 |
| DE | 102012219888 A1 | 4/2014 |
| EP | 2921694 B1 | 9/2015 |
| WO | 2006061017 A1 | 6/2006 |

OTHER PUBLICATIONS

PCT International Search Report and Written Opinion dated Aug. 4, 2023 for International Application No. PCT/EP2023/061693, 12 pages.

\* cited by examiner

METHOD OF EXCHANGING A RACK OF A RACK AND PINION DRIVE ARRANGEMENT AND JIG ASSEMBLY

CROSS-REFERENCE TO RELATED APPLICATIONS

This application is a 371 U.S. National Stage of International Application No. PCT/EP2023/061693, filed May 3, 2023, which claims priority to European Patent Application No. 22171282.1, filed May 3, 2022. The disclosures of each of the above applications are incorporated herein by reference in their entirety.

TECHNICAL FIELD

Background

Rack and pinion drive arrangements are frequently used for the transformation of a rotational movement into a linear movement and/or vice versa. Such rack and pinion drive arrangements may e.g. be used at linear actuators and lifting arrangements where the rotational movement of a motor is transformed into a linear actuation or lifting movement. Another exemplifying field of application is energy harvesting such as at wave energy harvesting where a reciprocal linear movement of a buoy or the like is transformed into a rotational movement of an output shaft by means of a rack and pinion drive arrangement.

At applications where great forces and/or torques are to be transformed, the rack and pinion drive arrangement preferably comprises a plurality of pinions meshing with one and the same rack. By this means, the torque to be transmitted may be divided between several pinions and between a corresponding number of gears fixed to a respective pinion, such that the load on each torque transmitting tooth flank may be reduced. Such rack and pinion drive arrangements comprising multiple pinions are over-determined. Such over-determination may cause problems related to that the tooth flanks of different pinions and gears simultaneously in load transmitting engagement experience different load. In order to overcome these problems, it has been suggested to introduce a certain rotational flexibility or compliancy between each pinion and its corresponding gear.

EP2921694B1 discloses a rack and pinion drive arrangement comprising a toothed rack and a gearbox containing a plurality of pinions meshing with the rack. Each pinion is fixed to a respective primary gear, which primary gears are mechanically connected to a common in—or output shaft of the gearbox. In order to enhance the load distribution to all tooth flanks in simultaneous engagement, each pinion is fixed to the respective primary gear by means of a respective elastically deformable fixation device which allows a limited relative rotation between the respective pinion and primary gear.

At such rack and multiple pinion drive arrangements provided with means for rotational compliance between the pinions and the respective primary gears, it is important that the relative nominal rotational position between each pinion and primary gear is accurately adjusted or calibrated. Additionally, any pre-tensioning of the elastically deformable device providing the rotational compliancy needs to be accurately adjusted or calibrated for each pair of pinion and primary gear as well as in relation to each other pair of pinion and primary gear.

Such adjustment or calibration needs to be carried out before or at commissioning of the arrangement and with a rack installed in engagement with the pinions. However, at many applications the rack exhibits considerable length in relation to the gearbox. Additionally, the rack often needs to be strong and durable which results in that the rack is heavy. At high precision applications, the straightness of the rack as well as the geometry and the surface finish of the teeth need to be kept within narrow tolerances. Hence, the assembly and adjustment or calibration as well as other handling of such rack and pinion drive arrangements comprising long and heavy racks is often cumbersome and there is often a considerable risk that the rack may be damaged.

A further problem is caused by the fact that the rack needs to be maintained in meshing contact with the pinions after adjustment or calibration until commissioning, in order not to lose the calibration. Especially at applications requiring long and heavy racks, this results in difficult and cumbersome transportation of the arrangement with installed rack from the assembly site to the site of use.

SUMMARY

An object of the present disclosure is to provide a method of exchanging the rack of a rack and pinion drive arrangement, and a jig assembly which facilitate assembly, calibration, testing, transportation, installation and/or commissioning of rack and pinion drive arrangements comprising means for rotational compliance between pairs of pinions and primary gears.

Another object is to provide such a method which is easy to carry through.

A further object is to provide such jig assembly which is simple in design.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

According to a first aspect, the present disclosure provides a method of exchanging a rack of a rack and pinion drive arrangement which comprises a first toothed rack and a gearbox comprising a plurality of pinions which are arranged to mesh with the first rack which pinions are connected to a respective primary gear by means of a rotational compliance device. The method is defined in appended claim 1 and comprises;

providing a rack and pinion drive arrangement with a first rack installed in meshing engagement with the pinions of the gearbox, providing a jig assembly comprising a second toothed rack and a coupling arrangement, arranging the second rack in longitudinal coaxial alignment with the first rack, connecting a first end of the second rack to a proximal end of the first rack, by means of the coupling arrangement, bringing the second rack into meshing engagement with the pinions of the gearbox by linear displacement of the first and second rack, and disconnecting the first rack from the second rack, which method further comprises;

calibrating the nominal rotational position between each pinion and primary gear when the first or the second rack is in meshing engagement with the pinions of the gear box.

The first rack may thus constitute a "utility rack" which hereinafter denominates a rack which is intended to be installed in the gearbox and in engagement with the pinions at normal operation of the rack and pinion drive arrangement. The second rack may constitute an "auxiliary rack" which hereinafter denominates a rack which is intended to be temporarily used as a replacement of the utility rack during e.g. assembly, calibration, testing transportation and/or commissioning of the rack and pinion drive arrangement.

The term "jig assembly" is herein used to denominate a collection of components arranged to locate, guide and/or hold one of said components in alignment with a further component not forming part of the jig assembly. More specifically the "jig assembly" described herein comprises a second or auxiliary rack and a coupling arrangement which coupling arrangement is arranged to releasably connect the second or auxiliary rack to and in alignment with a first or utility rack which does not form part of the jig assembly.

The method allows for that an auxiliary rack may readily be fixed as a longitudinal extension to the utility rack of a rack and pinion drive arrangement. By this means the utility rack may be used during the assembly and calibration of the rack and pinion drive arrangement. Using the utility rack in toothed engagement with the pinions during calibration ascertains that the nominal relative rotational position between each pinion and primary gear as well as the pre-tensioning of any elastic compliance member is accurately adjusted with respect to the actual tooth geometry of the utility rack. Once the calibration has been accomplished, the utility rack and the auxiliary rack fixed to an end of the utility rack may be linearly displaced until the pinions of the gearbox are brought into toothed engagement with the auxiliary rack. Thereafter the utility rack may be disconnected from the auxiliary rack. As long as the auxiliary rack exhibits approximately the same tooth geometry as the utility rack, the nominal relative rotational position as well as the pre-tensioning accomplished during calibration will then be maintained after replacement of the utility rack by the auxiliary rack in the gearbox.

The rack and pinion drive arrangement may thereafter be transported with the utility rack separated from the gearbox with the auxiliary rack. This affords for an important advantage since the utility rack at many applications may be very long in relation to the length of the gearbox. Due to the slender configuration of such long and heavy utility racks, transportation and other handling of the rack and pinion drive arrangement with installed utility rack amounts to considerable risks of damaging the utility rack and/or the gearbox. This problem is efficiently eliminated or reduced by the method which allows for that the long and heavy utility rack may be transported and handled separated from the gearbox until the rack and pinion drive arrangement has been finally commissioned at the site of use. During such transportation and handling, the auxiliary rack, which is kept in toothed engagement with the pinions, ensures that the calibration of the gearbox is maintained during the transportation and handling.

After transportation to the site of use, the method allows for that the utility rack may readily be fixed as a prolongation to the auxiliary rack. The utility rack may thereafter be brought into engagement with the pinions in the gearbox, again without risking the previously accomplished calibration to be lost. Once the utility rack has been finally installed, the auxiliary rack may be disconnected and removed from the utility rack. The auxiliary rack may thereafter be used in a similar manner at other rack and pinion drive arrangements.

If the auxiliary rack exhibits the same tooth geometry as the utility rack it is also possible to use the auxiliary rack in engagement with the pinions during calibration as well as during testing of the gearbox. At such instances the auxiliary rack may be kept in engagement with the pinions until the final assembly or commissioning of the rack and pinion drive arrangement where it is replaced by the utility rack by fixing the utility rack as a prolongation to the utility rack and linearly displacing the so connected racks until the utility rack is brought into engagement with the pinions.

The method may also be used at maintenance and repair of a rack and pinion drive arrangement, where it is necessary to temporarily remove or to replace the utility rack. At such instances the auxiliary rack is fixed to the existing utility rack and thereafter linearly displaced until the pinions are brought into engagement with the auxiliary rack. The existing utility rack is thereafter disconnected from the auxiliary rack for reparation and thereafter again connected to the auxiliary rack for being reengaged with the pinions by linear displacement. Alternatively, after disconnection of the existing utility rack a replacement utility rack may be connected to the auxiliary rack and brought into engagement with the pinions.

The method thus provides a simple and efficient means for calibrating and/or maintaining the calibration of the pinions and primary gears of a rack and pinion drive arrangement during assembly, testing, transportation, commissioning, repair and maintenance.

According to one embodiment the method comprises arranging at least one toothed surface of the second rack in coplanar alignment with a corresponding toothed surface of the first rack.

The method may comprise inserting at least one distance member between the first end of the second rack and the proximal end of the first rack, for adjusting the pitch between an outmost tooth at the first end and an outmost tooth at the proximal end.

The coupling means may comprise a rod which extends longitudinally in a bore through the second rack and the method may then comprises connecting the rod to the proximal end and longitudinally tensioning the rod for pressing the first end towards the proximal end.

The step of bringing the second rack into meshing engagement with the pinions of the gearbox by linear displacement of the first and second rack may be accomplished by rotating an in-/or output shaft of the gearbox.

According to a second aspect there is provided jig assembly as set out in appended claim 6. The jig assembly is intended for use when exchanging a rack of a rack and pinion drive arrangement, which arrangement comprises a first toothed rack and a gearbox comprising a plurality of pinions arranged to mesh with the first rack. The jig assembly comprises; a second toothed rack extending from a first end to a second end; and a coupling arrangement for releasably connecting the first end of the second rack to a proximal end of the first rack. The coupling arrangement comprises; a guiding means arranged to hold the second rack in longitudinal coaxial alignment with the first rack, a rod which extends through a longitudinal bore in the second rack and which exhibits a first rod end which is connectable to the proximal end of the first rack, and a tensioning arrangement which is connectable to the rod and arranged to engage the second rack, for tensioning the rod to thereby press the first end towards the proximal end.

The jig assembly provides an efficient means for carrying out the method according to the first aspect.

The jig assembly may comprise at least one distance member arranged to be interposed between said first end of the second rack and the proximate end of the first rack when the second rack is connected to a first rack. The distance member may comprise a shim or a similar device. Such a single distance member or a plurality of distance members may be interposed between the second rack and the first rack for maintaining the correct tooth geometry at the transition between the utility rack and the auxiliary rack. In particular, such a single or plurality of distance members may be used to adjust the pitch between an outmost tooth at the first end and an outmost tooth at the proximal end.

The guiding means may comprise a bushing which is radially guidedly received in said bore at the first end and arranged to connect the rod to the proximal end.

The bushing may comprise a first portion which is received in said bore with a transition fit, a clearance fit or an interference fit.

The bushing may comprise an external or internal thread arranged for threaded engagement with a corresponding thread arranged at the proximal end of the first rack. This allows for a simple and reliable design of the jig assembly and permits the first and second racks to be mutually connected by a simple operation.

The bushing may comprise an externally threaded portion which protrudes longitudinally out from the first end of the second rack.

The tensioning arrangement may comprise a first screw joint.

The first screw joint may comprise an external thread arranged at a second rod end of the rod and a stop member which stop member exhibits a corresponding internal thread and a stop surface arranged to be supported by an end surface arranged at the second end of the second rack.

The jig assembly may further comprise at least one annular support member arranged to be received in the bore and to supportingly receive said rod.

The rod may be fixable to the bushing by means of a second screw joint.

The jig assembly provides the same advantages as set out above.

Further objects and advantages will appear from the following description of exemplifying embodiments and from the appended claims.

BRIEF DESCRIPTION OF THE DRAWINGS

Aspects and embodiments will now be described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

FIGS. 1-4 illustrate a rack and pinion drive arrangement provided with a jig assembly 30 according to a first embodiment. The rack and pinion drive arrangement comprises a first rack in the form of a utility rack 10 and a gearbox 20.

The utility rack 10 extends longitudinally from a first end 11a to a second end 11b. The second end 11b forms a proximal end when using the jig assembly as will be explained more in detail below. The utility rack 10 exhibits a first planar toothed surface 12a and a second planar toothed surface 12b arranged opposite to the first toothed surface. The first and second toothed surfaces 12a, 12b extend essentially over the entire length of the utility rack 10, Especially, both toothed surfaces 12a, 12b extend all the way to the second proximal end 11b. The toothed surfaces 12a, 12b are connected by curved circumferential surfaces of the rack 10 such that the utility rack exhibits an oval-like cross-section.

The utility rack 10 shown in the figures is, for visibility reasons, made shorter than what utility racks normally are at many applications. Typically, the utility rack may be up to 10 m. long. The utility rack may be formed of different materials and one example is machined cast steel. For strength and durability reasons the utility rack is normally formed solid without internal cavities, bores or the like. Typically, the weight of a 10 m long utility rack may be up to 1000 kg.

Figure 1:
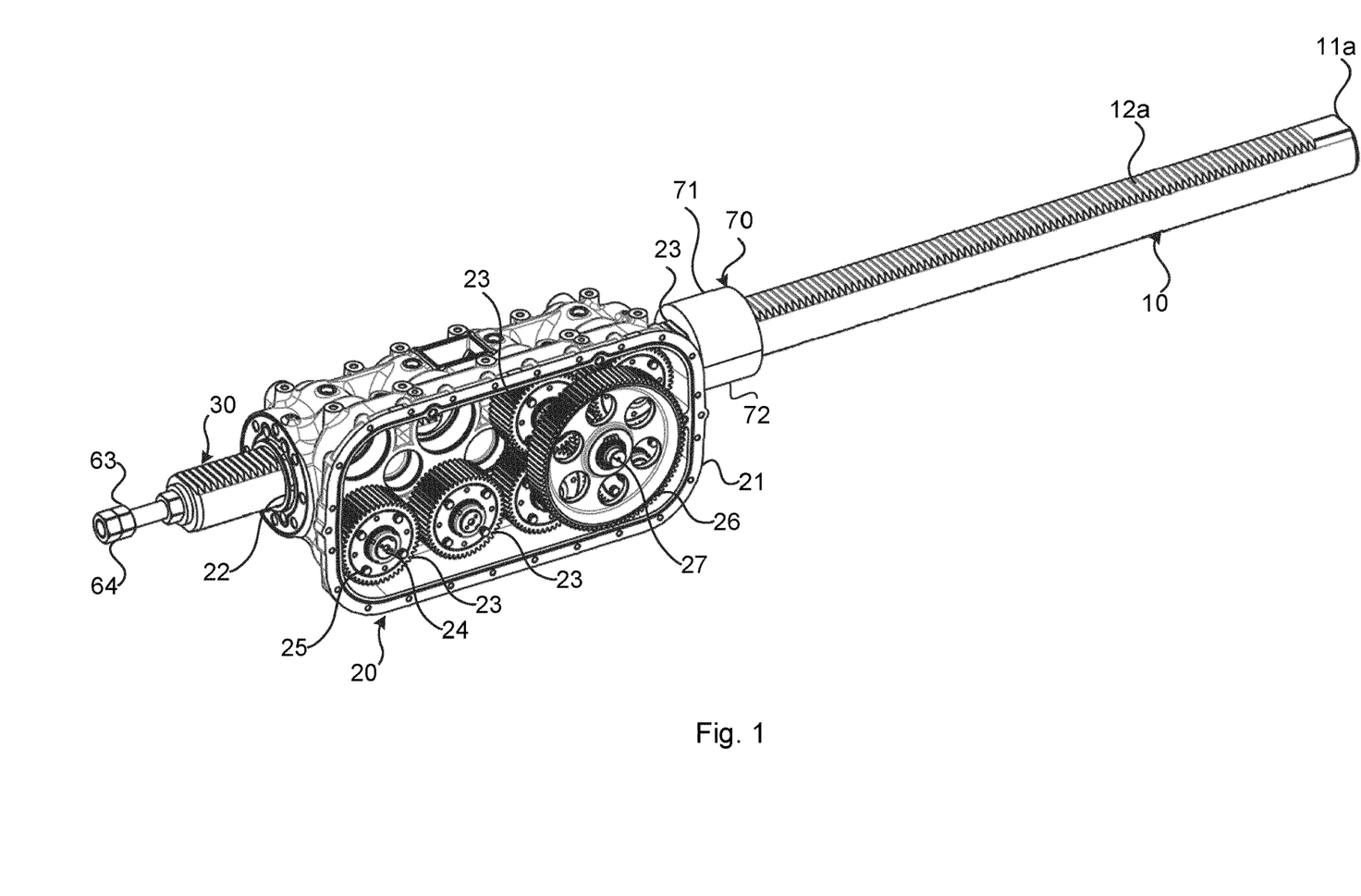
FIG. 1 is a perspective partly exploded view illustrating a rack and pinion drive arrangement provided with a jig assembly according to an embodiment, when fixed to a utility rack of the rack and pinion drive arrangement.

The gearbox 20 comprises a housing 21 having a longitudinal channel 22 for receiving a portion of the utility rack 10. In the shown example, the gearbox comprises eight pinions (not shown) which are arranged in the housing 21 such that each pinion may mesh with one of the toothed surfaces 12a, 12b of the utility rack 10. Here, four pinions are meshing with each of the toothed surfaces 12a, 12b. Each pinion is connected to a respective primary gear 23 by means of a shaft 24 and a rotational compliance device 25. The primary gears 23 are arranged such that two primary gears 23 connected with a respective pinion meshing with the first toothed side 12a and two primary gears 23 connected with a respective pinion meshing with the second toothed side 12b jointly meshes with one and the same secondary gear (not shown). The gearbox 20 thus comprises two secondary gears. Each secondary gear is further connected to a tertiary gear 26 by means of a respective shaft 27. The two tertiary gears 26 mesh with a common quaternary gear (not shown) which in turn is connected to a single out-or input shaft (nor shown) of the rack and pinion drive arrangement. In the shown example, where the arrangement may be used as a linear actuator or lifting device, the quaternary gear is connected to an input shaft (not shown) which in turn is connected to an electrical motor (not shown).

For enhancing the load distribution between the cog flanks of the pinions and gears simultaneously in engagement during torque transmission, the gearbox 20 comprises means for providing a rotational compliance. In the shown example this is accomplished by connecting each pinion with the respective primary gear 23 by means of a rotational compliance device 25. Each compliance device is fixed to the respective shaft 24 and primary gear 23. Each compliance device 25 further comprises an elastically deformable fixation device (not shown) which allows a limited relative rotation between the primary gear 23 and the pinion.

A known rack and pinion drive arrangement comprising a number of compliance devices as described above is disclosed in EP22921694B1 and is not described further in detail here.

Figure 2:
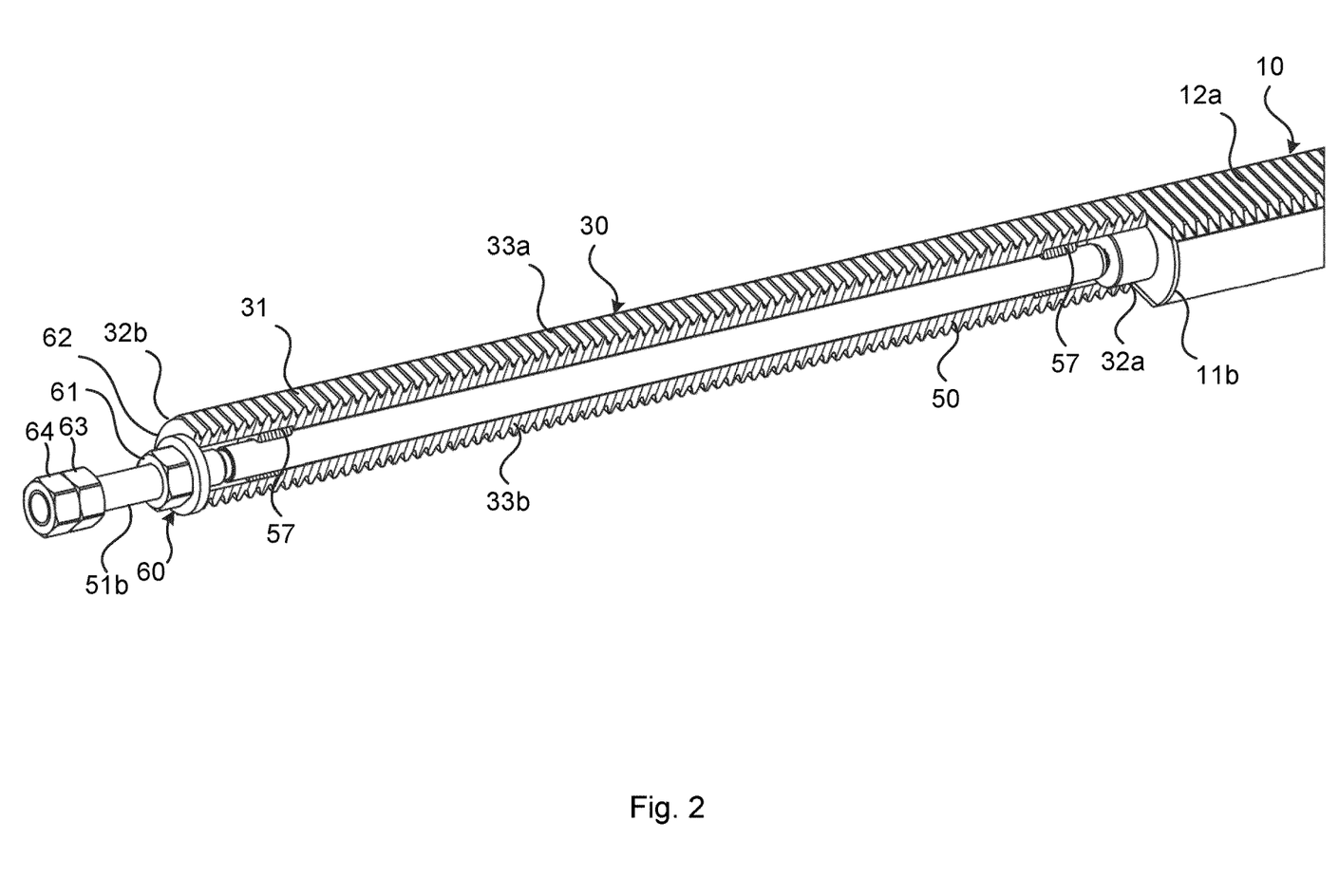
FIG. 2 is a perspective partly exploded view illustrating the jig assembly and a portion of the utility rack shown in FIG. 1

The jig assembly 30 comprises a second rack which forms an auxiliary rack 31. The auxiliary rack 31 extends longitudinally from a first end 32a to a second end 32b. The first end 32b is intended to be facing the proximal end 11b of the utility rack 10 when using the jig assembly 30. The auxiliary rack 31 exhibits a first planar toothed surface 33a and a second planar toothed surface 33b arranged opposite to the first toothed surface 33a. The first and second toothed surfaces 33a, 33b extend essentially over the entire length of the utility rack 10, Especially, both toothed surfaces 33a, 33b extend all the way to the first end 32a. The toothed surfaces 33a, 33b are connected by curved circumferential surfaces of the auxiliary rack 31 such that the utility rack 31 exhibits an oval-like cross-section, which is similar to the cross-section geometry of the utility rack 10.

The tooth geometry of the first and second toothed surfaces 33a, 33b is similar to the tooth geometry of the utility rack 10. At applications where the jig assembly 30 is to be meshing with the pinions in the gearbox 20 during calibration of the rack and pinion arrangement, it is important that the tooth geometry of the auxiliary rack is near to identical with the tooth geometry of the utility rack to be used at normal operation. In cases where the utility rack to be used at normal operation is also used for calibration and where the auxiliary rack is used e.g. at transportation of the rack and pinion arrangement, it may suffice that the tooth geometry of the auxiliary rack generally resembles the tooth geometry of the utility rack. Also in such cases, the auxiliary rack meshing with the pinions during transportation will be able to maintain the nominal relative rotation between the pinions and the primary gears as well as the pre-tensioning of the elastically deformable compliance member achieved by the calibration.

Normally, the auxiliary rack 31 may be considerably shorter than the utility rack 10. Typically, it suffices that the auxiliary rack 31 is somewhat longer than the longitudinal length of the gearbox 20. Additionally, since the auxiliary rack is not intended to be exposed to any significant loads which may occur during normal operation, the auxiliary rack may be formed from a weaker, less sustainable, and thereby a lighter and cheaper material having lower performance than the utility rack.

Figure 3:
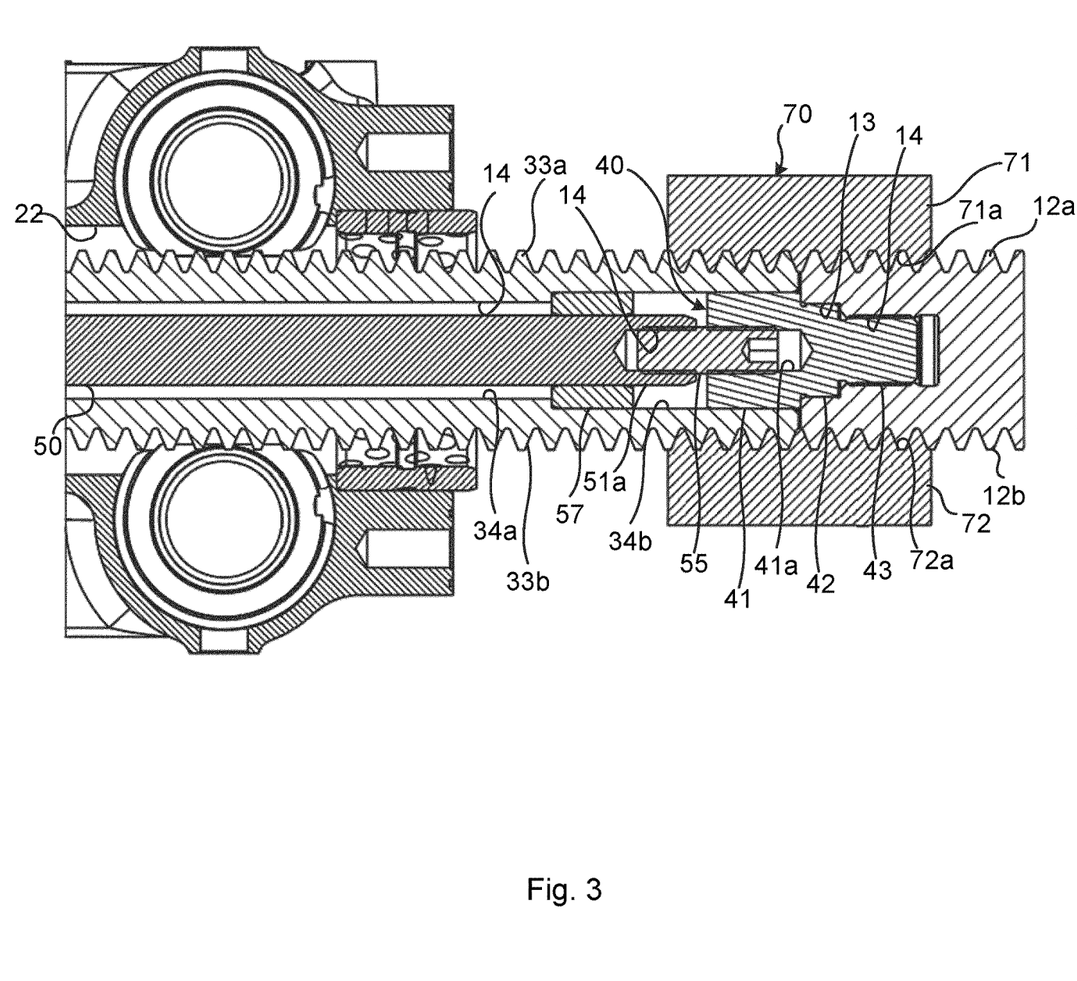
FIG. 3 is a longitudinal section in enlarged scale showing a portion of the rack and pinion drive arrangement with the jig assembly shown in FIG. 1.
Figure 4:
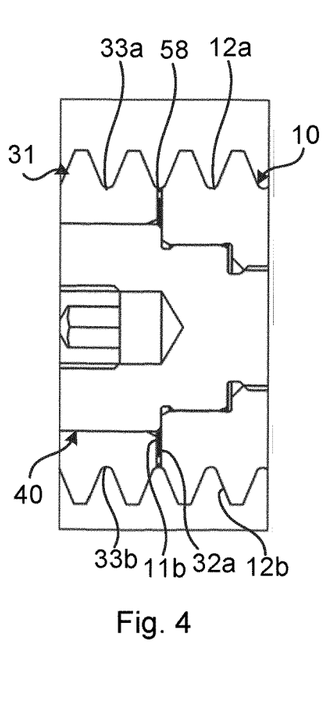
FIG. 4 is a longitudinal section in enlarged scale of a portion of the arrangement shown in FIG. 3

The auxiliary rack 31 exhibits a central bore 34 extending from the first 32a to the second 32b end of the auxiliary rack 31. The central bore 34 exhibits a central portion 34a having a first diameter and two end portions 34b arranged at a respective end 32a, 32b of the auxiliary rack 31. The end portions 34b have a diameter which is slightly larger than the diameter of the central portion 34b such that an outwardly facing annular stop surface 34c is formed in proximity to each end 32a, 32b of the auxiliary rack 31.

The jig assembly 30 further comprises a coupling arrangement for connecting the auxiliary rack 31 to the utility rack 10. The coupling arrangement comprises a guiding means, which in the shown example comprises a bushing 40. The coupling arrangement further comprises a rod 50 and a tensioning arrangement 60.

The bushing 40 has a first cylindrical portion 41 which is received with a tight fit in that end portion 34b of the bore which is arranged at the first end 32a of the auxiliary rack 31. The first cylindrical portion 41 exhibits a central internally threaded recess 41a facing towards the second end 32b of the auxiliary rack 31. A second cylindrical portion 42 having a smaller diameter extends axially from the first cylindrical portion 41 and is received with a tight fit in a cylindrical recess 13 arranged in the proximal end 11b of the utility rack 10. A third cylindrical portion 43 with an external thread extends axially from the free end of the second cylindrical portion 42 and is threadedly engaged in an internally threaded recess 14 extending axially from the bottom of the cylindrical recess 13 in the utility rack 10.

The rod 50 is received in the bore 34 and exhibits a first rod end 51a arranged in proximity to the first end 32a of the auxiliary rack 31 and a second rod end 51b which extends out passed the second end 32b of the auxiliary rack 31. The first rod end 51a exhibits an axial internally threaded recess 52 and the second rod end 51b exhibits an external thread. The rod 50 is connected to the bushing 40 by means of a screw joint. More precisely at the shown example, the first rod end 51a is connected to the bushing 40 by means of an externally threaded fixation member 55 which is threadedly engaged in the recess 41a of the bushing and with the recess 52 in the first rod end 51a.

The tensioning arrangement 60 also comprises a screw joint. In the shown example, the tensioning arrangement 60 comprises a stop member 61 in the form of an internally threaded nut which is threadedly engaged with the external thread on the second rod end 51b. The stop member 61 is axially supported by an end surface of the auxiliary rack's 30 second end 32b. In the shown example a washer 62 is arranged between the stop member 61 and said end surface. Two additional nuts 63, 64 are threaded onto the threaded second rod end 51 and mutually interlocked for allowing the rod 50 to me rotated by means of a wrench or a similar tool engaging either or both additional nuts 63, 64.

At the shown example, the jig assembly further comprises an alignment collar 70 which may be used for aligning the planar toothed surfaces 33a, 33b of the auxiliary rack 31 with the toothed planar surfaces 12a, 12b of the utility rack during fixation of the auxiliary rack 31 to the utility rack 10. The alignment collar comprises an upper half 71 and a lower half 72 each half exhibiting a respective internal planar toothed surface 71a, 72a. The upper 71 and lower 72 halves may be fixed to each other by non-shown fastening means, such as screws or the like.

When exchanging a utility rack 10 installed in engagement with the pinions of a rack and pinion drive arrangement by an auxiliary rack, the utility rack 10 is first linearly displaced such that the proximal end 11b is protrudes accessibly from the gearbox 20. The second cylindrical portion 43 of the bushing 40 is then screwed into the threaded recess 14 at the proximal end 11b of the utility rack 10. Thereby the bushing 40 is fixed to the utility rack 10 in a manner such that its first cylindrical portion 41 extends axially from the proximal end 11b. Thereafter, the first end 32a of the auxiliary rack 31 is positioned face to face with the proximal end 11b of the auxiliary rack 10, such that they are longitudinally aligned and rotationally oriented such that each planar toothed surface 33a, 33b of the auxiliary rack 31 is coplanar with the corresponding toothed surface 12a, 12b of the utility rack 10. For facilitating this operation, the internal planar toothed surfaces 71a, 72a of the alignment collar 70 may be brought into engagement with the first toothed surfaces 12a, 33a and the second toothed surfaces 12b, 33b of the utility and auxiliary racks respectively and the two alignment collar halves 71, 72 may then be fastened together.

When the auxiliary rack 31 has been so positioned relative to the utility rack 10, the first cylindrical portion 41 of the bushing 40 is received in the end portion 34b of the bore 34.

Thereafter or before, the rod 50 may be prepared by screwing the fixation member 55 into the recess 52 at the first rod end 51a. The rod 50 may then be inserted into the bore 34 from the second end 32b of the auxiliary rack and displaced linearly until the first rod end 51a reaches the bushing 40. For facilitating this insertion, annular distance members 57 for receiving the rod 50 may first have been inserted into the bore 34. At the shown example two such distance members 57 have been inserted with a tight fit into the bore 34, one at each transition from the central bore portion 34a to a respective end portion 34b of the bore 34. By this means each distance member 57 is supported radially and in a respective axial direction.

Thereafter the rod 50 may be fixed to the bushing 40 by rotating the rod such that the free end of fixation member 55 is screwed into the threaded recess 41a of the bushing's 40 first cylindrical portion 41. When the rod 50 has been securely fixed to the busing 40, the rod 50 may be axially tensioned by fastening the stop member 61 such that the washer 62 is clamped between the stop member 61 and the end surface of the auxiliary rod's 31 second end 32b. Such tensioning of the rod 50 results in that the first end 32a of the auxiliary rack is forced into contact with the end surface of the utility rack's 10 proximal end. Simultaneously the auxiliary rack 31 is radially fixed relative to the utility rack 10 by means of the bushing 40 which is threadedly fixed to the utility rack and received with a tight fit in the bore 34 of the auxiliary rack. By this means the auxiliary rack 31 has been rigidly and securely fixed to the utility rack 10 and the alignment collar 70 may then be removed.

After such fixation, the utility rack 10 and the auxiliary rack 31 may be jointly displace linearly until the utility rack is brought out from the gearbox housing 21 and the auxiliary rack 31 is brought into meshing engagement with the pinions of the gearbox 20.

The utility rack 10 may then be disconnected from the auxiliary rack by rotating the rod 50 such that the fixation member 55 is disengaged from the bushing 40, which allows the utility rack 10 to be removed. The bushing 40 may thereafter be unscrewed from the proximal end 11b of the utility rack 10.

As indicated in FIG. 4 the jig assembly may further comprise one or several shims 58 which may be inserted between the end surface of the utility rack's 10 proximal end 11b and the end surface of the auxiliary rack's 31 first end 32a. Such shims 58 may be used for ascertaining a correct tooth geometry, especially a correct tooth pitch, at the junction between the utility rack 10 and the auxiliary rack 31. Depending on the tolerances of the machined surfaces of the utility and auxiliary racks as well as the bushing 40, any suitable number of shims may be inserted for achieving the correct distance between the adjacent teeth at the junction between the two racks 10, 31.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the appended patent claims. For example, the screw joints described above may be inversed such that the internal threads are replaced by external threads and vice versa. Additionally, other fastening means than screw joints, such as bayonet couplings or the like may be used where applicable. Naturally, the rack and pinion drive arrangement may be configured in many other ways than what is shown in the figures and disclosed above. The gearbox may e.g. be provided with any suitable numbers of pinions, such as 2, 4, 6, 10 or 12 and a corresponding number of primary gears. The method and jig assembly disclosed herein may find advantageous applications at many different such rack and pinion drive arrangements, especially if they are overdetermined and comprises means for accomplishing a rotational compliance between the pinions and corresponding primary gears.

The invention claimed is:

1. A method of exchanging a rack of a rack and pinion drive arrangement, which arrangement comprises a first toothed rack and a gearbox comprising a plurality of pinions which are arranged to mesh with the first rack which pinions are connected to a respective primary gear via a rotational compliance device, which method comprises;
   providing a rack and pinion drive arrangement with a first rack installed in meshing engagement with the pinions of the gearbox,
   providing a jig assembly comprising a second toothed rack and a coupling arrangement,
   arranging the second rack in longitudinal coaxial alignment with the first rack,
   connecting a first end of the second rack to a proximal end of the first rack via the coupling arrangement,
   bringing the second rack into meshing engagement with the pinions of the gearbox by linear displacement of the first and second rack, and
   disconnecting the first rack from the second rack, which method further comprises;
   calibrating the nominal rotational position between each pinion and primary gear when the first or the second rack is in meshing engagement with the pinions of the gearbox.

2. The method according to claim 1, comprising arranging at least one toothed surface of the second rack in coplanar alignment with a corresponding toothed surface of the first rack.

3. The method according to claim 1, comprising inserting at least one distance member between the first end of the second rack and the proximal end of the first rack, for adjusting the pitch between an outmost tooth at the first end and an outmost tooth at the proximal end.

4. The method according to claim 1, wherein the coupling means comprises a rod which extends longitudinally in a bore through the second rack and wherein the method comprises connecting the rod to the proximal end and longitudinally tensioning the rod for pressing the first end towards the proximal end.

5. The method according to claim 1, wherein bringing the second rack into meshing engagement with the pinions of the gearbox by linear displacement of the first and second rack is accomplished by rotating an in-/or output shaft of the gearbox.

6. A jig assembly for use at exchange of a rack of a rack and pinion drive arrangement, which arrangement comprises a first toothed rack and a gearbox comprising a plurality of pinions arranged to mesh with the first rack which pinions are connected to a respective primary gear via a rotational compliance device, which jig assembly comprises:
   a second toothed rack arranged to mesh with the pinions of the gearbox and extending from a first end to a second end; and
   a coupling arrangement for releasably connecting the first end of the second rack to a proximal end of the first rack, which coupling arrangement comprises;

a guiding means arranged to hold the second rack in longitudinal coaxial alignment with the first rack, a rod which extends through a longitudinal bore in the second rack and which exhibits a first rod end which is connectable to the proximal end of the first rack, a tensioning arrangement which is connectable to the rod and arranged to engage the second rack for tensioning the rod to thereby press the first end towards the proximal end.

7. A jig assembly according to claim 6, further comprising at least one distance member arranged to be interposed between said first end of the second rack and the proximate end of the first rack when the second rack is connected to a first rack.

8. A jig assembly according to claim 6, wherein the guiding means comprises a bushing which is radially, guidedly received in said bore at the first end and arranged to connect the rod to the proximal end.

9. A jig assembly according to claim 6, wherein the bushing comprises a first portion which is received in said bore with a transition fit, a clearance fit or an interference fit.

10. A jig assembly according to claim 8, wherein the bushing comprises an external or internal thread arranged for threaded engagement with a corresponding thread arranged at the proximal end of the first rack.

11. A jig assembly according to claim 10, wherein the bushing comprises an externally threaded portion which protrudes longitudinally out from the first end of the second rack.

12. A jig assembly according to claim 6, wherein the tensioning arrangement comprises a first screw joint.

13. A jig assembly according to claim 12, wherein the first screw joint comprises an external thread arranged at a second rod end of the rod and a stop member which stop member exhibits a corresponding internal thread and a stop surface arranged to be supported by an end surface arranged at the second end of the second rack.

14. A jig assembly according to claim 1, further comprising at least one annular support member arranged to be received in the bore and to supportingly receive said rod.

15. A jig assembly according to claim 1, wherein the rod is fixable to the bushing via a second screw joint.

16. A rack and pinion drive arrangement comprising a first toothed rack and a gearbox comprising a plurality of pinions which are arranged to mesh with the first rack which pinions are connected to a respective primary gear via a rotational compliance device, which rack and pinion drive arrangement further comprises a jig assembly according to claim 6.

* * * * *